(12) United States Patent
Voit et al.

(10) Patent No.: US 11,960,607 B2
(45) Date of Patent: Apr. 16, 2024

(54) ACHIEVING MINIMUM TRUSTWORTHINESS IN DISTRIBUTED WORKLOADS

(71) Applicant: Cisco Technology, Inc., San Jose, CA (US)

(72) Inventors: Eric Voit, Bethesda, MD (US); Einar Nilsen-Nygaard, East Ayrshire (GB); Frank Brockners, Cologne (DE); Pradeep Kumar Kathail, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 96 days.

(21) Appl. No.: 17/547,084

(22) Filed: Dec. 9, 2021

(65) Prior Publication Data
US 2023/0185918 A1 Jun. 15, 2023

(51) Int. Cl.
*G06F 21/57* (2013.01)

(52) U.S. Cl.
CPC ........ *G06F 21/57* (2013.01); *G06F 2221/033* (2013.01)

(58) Field of Classification Search
CPC ... G06F 21/57; G06F 2221/033; G06F 21/577
See application file for complete search history.

(56) References Cited

U.S. PATENT DOCUMENTS

| | | | |
|---|---|---|---|
| 11,570,264 B1 * | 1/2023 | Poornachandran | ... H04L 67/104 |
| 2013/0198797 A1 | 8/2013 | Raghuram et al. | |
| 2015/0082045 A1 | 3/2015 | D'Souza et al. | |
| 2017/0170970 A1 | 6/2017 | Leighton et al. | |
| 2019/0138729 A1 | 5/2019 | Blundell | |
| 2019/0155728 A1 | 5/2019 | Ferguson et al. | |

(Continued)

FOREIGN PATENT DOCUMENTS

| CN | 115098866 A | 9/2022 |
|---|---|---|
| WO | WO2021067510 A1 | 4/2021 |

OTHER PUBLICATIONS

Davari, Maryam, et al, "Access Control Model Extensions to Support Data Privacy Protection based on GDPR" 2019 IEEE International Conference on Big Data (Big Data), IEEE, Dec. 9, 2019 (Dec. 9, 2019), pp. 4017-4024, XP033721622.

(Continued)

*Primary Examiner* — Beemnet W Dada
(74) *Attorney, Agent, or Firm* — Lee & Hayes, P.C.

(57) ABSTRACT

This disclosure describes techniques for selectively placing and maintaining sensitive workloads in subsystems that achieve a minimum level of trustworthiness. An example method includes identifying at least one trustworthiness requirement associated with an application and transmitting, to a first subsystem, a request for at least one trustworthiness characteristic of the first subsystem and at least one second subsystem connected to the first subsystem. A response indicating the at least one trustworthiness characteristic is received from the first subsystem. The example method further includes determining that the at least one trustworthiness characteristic satisfies the at least one trustworthiness requirement; and causing the application to operate on a mesh comprising the first subsystem and the at least one second subsystem.

16 Claims, 5 Drawing Sheets

(56) References Cited

U.S. PATENT DOCUMENTS

| | | |
|---|---|---|
| 2019/0220601 A1 | 7/2019 | Sood et al. |
| 2019/0281131 A1 | 9/2019 | Bartholomew et al. |
| 2020/0210585 A1 | 7/2020 | Thom et al. |
| 2021/0021619 A1 | 1/2021 | Smith et al. |
| 2021/0111892 A1 | 4/2021 | Anjo et al. |
| 2021/0194912 A1 | 6/2021 | Ward et al. |
| 2021/0216658 A1 | 7/2021 | Watson et al. |
| 2021/0263757 A1* | 8/2021 | Tsirkin ............... H04L 9/0897 |
| 2022/0345484 A1* | 10/2022 | Drozd ............... H04W 12/67 |
| 2023/0185760 A1* | 6/2023 | Balle ............... G06F 15/7871 |
| | | 712/35 |
| 2023/0185918 A1* | 6/2023 | Voit ............... G06F 21/57 |
| | | 726/22 |
| 2023/0185939 A1 | 6/2023 | Cam-Winget et al. |

OTHER PUBLICATIONS

PCT Search Report and Written Opinion dated Mar. 20, 2023 for PCT Application No. PCT/US2022/052300, 16 pages.

Singh, Jatinder, et al., "Enclaves in the Clouds: Legal Considerations and Broader Implications", ACM Queue: Tomorrow's Computing Today, Association for Computing Machinery, New York, NY, US, Vol. 18, No. 6, Dec. 31, 2020 (Dec. 31, 2020), pp. 1-37, XP058487713.

Office Action for U.S. Appl. No. 17/546,991, mailed on Sep. 6, 2023, Nancy Patricia Cam-Winget, "Enforcing Location-Based Data Privacy Rules Across Networked Workloads", 13 pages.

\* cited by examiner

ACHIEVING MINIMUM TRUSTWORTHINESS IN DISTRIBUTED WORKLOADS

TECHNICAL FIELD

The present disclosure relates generally to techniques for placing and operating workloads on subsystems within a distributed network, based on the trustworthiness of the subsystems.

BACKGROUND

Confidential computing can be performed when a secure enclave of a physical computing device s allocated to a particular application. In some cases, only a program with a proven developer can modify or have visibility into data processed or stored the secure enclave. Although confidential computing can greatly improve the security posture of sensitive applications, limiting an application to a single enclave in a single computing device greatly limits the scalability of the application.

Cloud computing enables application workloads to be distributed among multiple computing devices in a distributed network. Distributed applications can be easily scaled in a cloud computing network. However, distributing application workloads in a cloud computing network can present significant security risks, particularly to sensitive applications. For dynamic, sensitive applications, there is a need to achieve the security of confidential computing with the scalability of cloud computing.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
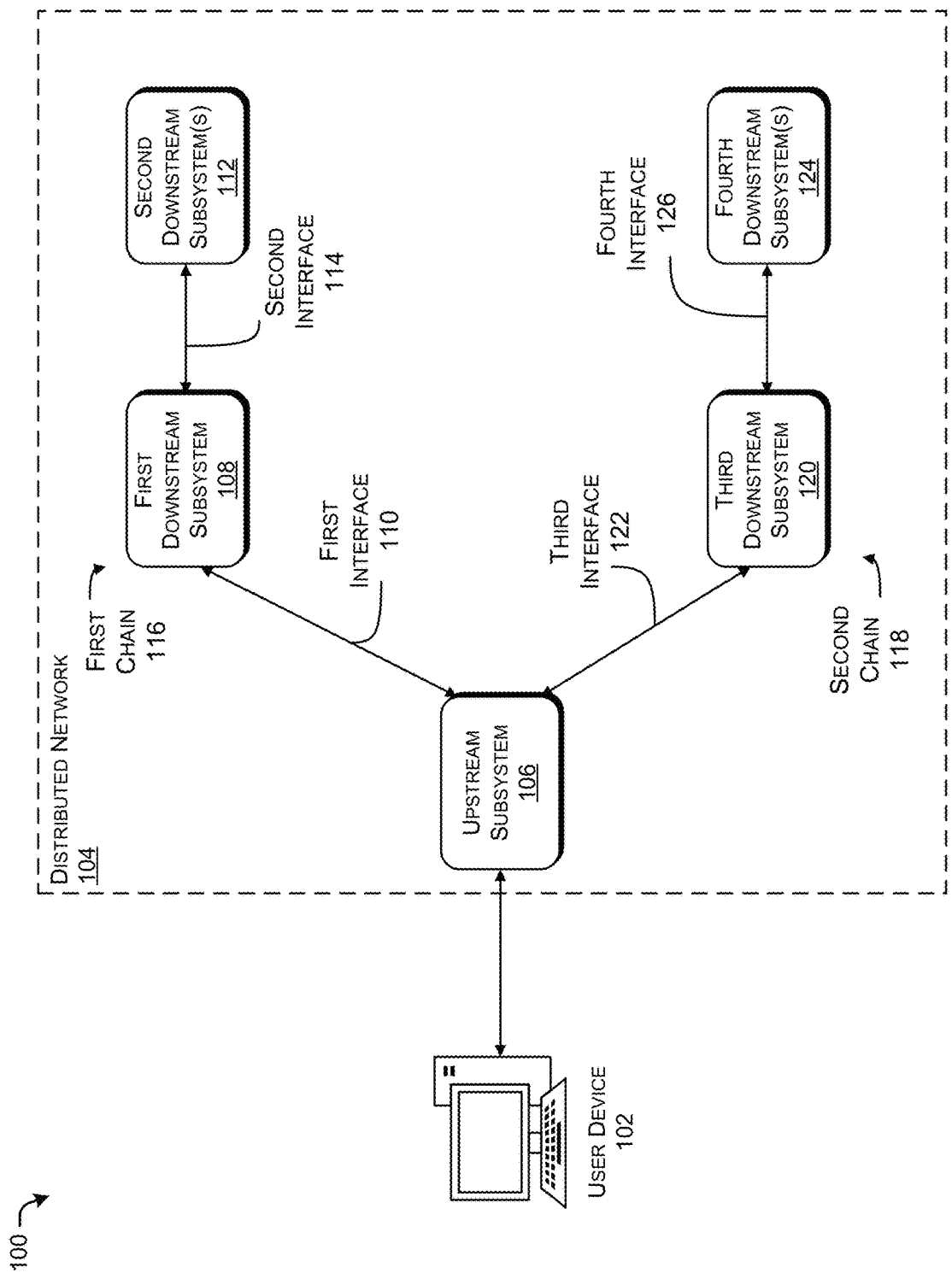
FIG. 1 illustrates an example environment for establishing a mesh of subsystems that satisfy a minimum trustworthiness requirement.

This disclosure describes various techniques for placing and maintaining workloads on sufficiently trustworthy subsystems within a distributed network. An example method includes identifying at least one trustworthiness requirement associated with an application; transmitting, to a first subsystem, a request for at least one trustworthiness characteristic of the first subsystem and at least one second subsystem connected to the first subsystem; receiving, from the first subsystem, a response indicating the at least one trustworthiness characteristic; determining that the at least one trustworthiness characteristic satisfies the at least one trustworthiness requirement; and based on determining that the at least one trustworthiness characteristic satisfies the at least one trustworthiness requirement, causing the application to operate on a mesh including the first subsystem and the at least one second subsystem.

In some examples, identifying the at least one trustworthiness requirement associated with the application includes receiving a message from a user device indicating the at least one trustworthiness requirement.

The at least one trustworthiness requirement, for example, specifies at least one of an executable, a configuration, a file type, a hardware type, or a firmware type. According to some implementations, the first subsystem includes a first microservice operating in a trusted execution environment (TEE) of a first device, and the at least one second subsystem includes at least one second microservice operating in at least one TEE of at least one second device. For instance, the at least one trustworthiness characteristic includes: at least one of an executable of the first microservice, a configuration of the first microservice, a file type stored or executed by the first device, a type of hardware of the first device, or a type of firmware of the first device; and at least one of an executable of the at least one second microservice, a configuration of the at least one second microservice, a file type stored or executed by the at least one second device, a type of hardware of the at least one second device, or a type of firmware of the at least one second device.

In various cases, the first subsystem and the at least one second subsystem include multiple subsystems connected in series within a distributed network.

According to some examples, the request is a first request transmitted at a first time, the response is a first response, the at least one trustworthiness characteristic is at least one first trustworthiness characteristic, and the example method further includes transmitting, to the first subsystem at a second time, a second request for at least one second trustworthiness characteristic of the first subsystem and the at least one second subsystem; receiving, from the first subsystem, a second response indicating the at least one second trustworthiness characteristic; determining that the at least one second trustworthiness characteristic fails to satisfy the at least one trustworthiness requirement; and based on determining that the at least one second trustworthiness characteristic fails to satisfy the at least one trustworthiness requirement, pruning the first subsystem and the at least one second subsystem from the mesh.

In various implementations, the request is a first request, the response is a first response, the at least one trustworthiness characteristic is at least one first trustworthiness characteristic, and the example method further includes transmitting, to a third subsystem, a second request for at least one second trustworthiness characteristic of the third subsystem and at least one fourth subsystem connected to the third subsystem; receiving, from the third subsystem, a second response indicating the at least one second trustworthiness characteristic; determining that the at least one second trustworthiness characteristic satisfies the at least one trustworthiness requirement; determining that the at least one first trustworthiness characteristic is superior to the at least one second trustworthiness characteristic; and transmitting, to a user device, a report indicating the at least one first trustworthiness characteristic. Causing the application to operate on a mesh including the first subsystem and the at least one second subsystem, for instance, is further based on determining that the at least one first trustworthiness characteristic is superior to the at least one second trustworthiness characteristic.

EXAMPLE EMBODIMENTS

This disclosure describes various techniques for establishing and/or tracking minimum levels of trustworthiness in a coordinated mesh of subsystems within a distributed network. An example environment may include: a user device, a relying subsystem connected to the user device, an attesting subsystem connected to the relying subsystem, and one or more downstream subsystems connected to the attesting subsystem. Each subsystem can be an independent computing device (e.g., a server), a virtual machine, a process, or the like. In particular cases, the subsystems reside in trusted execution environments (TEEs) within physical devices of a network.

A minimum trustworthiness requirement (e.g., a level) may be specified for an application, which may be distributed over a mesh including a chain of microservices in a distributed network. In some cases, the user device specifies the minimum trustworthiness requirement to the relying subsystem. Alternatively, the minimum trustworthiness requirement may be preconfigured at one or more of the subsystems in the environment. The trustworthiness requirement may specify one or more Boolean or integer values defining trustworthiness characteristics of subsystems. For instance, the trustworthiness level may specify that the hardware of a subsystem is authentic or may specify a particular technique for ensuring source data integrity.

Before the relying subsystem brings the attesting subsystem into the mesh, the attesting demonstrates that the attesting subsystem satisfies the minimum trustworthiness level. However, the trustworthiness of the attesting subsystem also depends on the trustworthiness of the downstream subsystem(s) connected to the attesting subsystem. Therefore, the attesting subsystem determines the trustworthiness of itself as well as of the downstream subsystem(s). This is accomplished by performing an attestation at each interface between each pair of subsystems in the chain. The attesting subsystem reports the trustworthiness of the entire chain including the attesting subsystem and the downstream subsystem(s) to the relying subsystem. If the relying subsystem determines that the trustworthiness of the chain (including the attesting subsystem and the downstream subsystem(s)) satisfies the minimum trustworthiness requirement, then the relying subsystem adds the chain to the mesh. In some cases, the relying subsystem advertises that the minimum trustworthiness requirement is satisfied with the mesh to the user device or advertises the actual trustworthiness characteristic satisfied by the mesh (which may be superior to the minimum trustworthiness requirement).

Because the trustworthiness characteristic of a given subsystem can change over time, this disclosure also contemplates techniques for removing subsystems from the mesh that do not satisfy the minimum trustworthiness requirement. For example, trustworthiness attestation is performed periodically at each interface between each connected pair of subsystems in the mesh. If a downstream subsystem no longer satisfies the minimum trustworthiness requirement, this is reported upstream through the chain due to the periodic attestations at each interface. In some cases, the relying subsystem may disconnect the entire chain of subsystems due to the insufficient trustworthiness of downstream subsystem. Alternately, the attesting subsystem may determine that the downstream subsystem is insufficiently trustworthy and may disconnect it from the mesh.

In some implementations, techniques can be used to maximize the trustworthiness of a mesh. For example, if the relying subsystem is choosing between two attesting subsystems for the mesh, the relying subsystem may chose the attesting subsystem with the superior trustworthiness characteristic.

Implementations of the present disclosure provide specific improvements in the technical field of distributed computing and confidential computing. For example, the attesting subsystem may evaluate and report the trustworthiness of not only immediately adjacent subsystems, but also other downstream subsystems in a chain of devices within a distributed network. Accordingly, the attesting subsystem can guarantee a minimum trustworthiness of an entire chain of devices and/or subsystems that are connected to each other within the distributed network. As a result, the attesting subsystem may establish and/or maintain a mesh of multiple subsystems that satisfy the minimum trustworthiness requirement, regardless of how those subsystems are connected to each other within the network.

Various implementations of the present disclosure will be described in detail with reference to the drawings, wherein like reference numerals present like parts and assemblies throughout the several views. Additionally, any samples set forth in this specification are not intended to be limiting and merely demonstrate some of the many possible implementations.

FIG. 1 illustrates an example environment 100 for establishing a mesh of subsystems that satisfy a minimum trustworthiness requirement. As shown, the environment 100 includes a user device 102 connected to a distributed network 104. The user device 102 may be a computing device, and may include at least one processor configured to execute instructions in order to perform various operations, which may be stored in memory or a non-transitory computer readable medium. Examples of computing devices include personal computers, laptops, servers, mobile devices (e.g., mobile phones), tablet computers, Internet of Things (IoT) devices, smart appliances, and the like.

The distributed network 104 may include various devices that are connected to each other. In some cases, the distributed network 104 is a cloud-based network. According to some implementations, the distributed network 104 includes multiple data centers located in different geographic locations, such as in different cities, different counties, different states, different countries, or a combination thereof. The devices within the data centers may communicate with each other over various communication interfaces and communication networks.

Although not specifically illustrated in FIG. 1, the user device 102 and the distributed network 104 may exchange data with each other over one or more communication networks. The communication network(s) may include one or more wired networks, one or more wireless networks, or a combination thereof. Wired networks may include at least one electrical interface and/or optical interface over which data is transmitted. Wireless networks include at least one Institute of Electrical and Electronics Engineers (IEEE) interface (e.g., a BLUETOOTH or WI-FI interface) and/or at least one $3^{rd}$ Generation Partnership Project (3GPP) interface (e.g., a Long Term Evolution (LTE) interface or New Radio (NR) interface) over which data is transmitted. Data may be transmitted over the communication network(s) in the form of data packets, such as Internet Protocol (IP) data packets. In some implementations, the data is encrypted during transmission over the communication network(s).

In various cases, the user device 102 may seek to utilize the computing resources of the distributed network 104. For example, the user device 102 may initiate placing a workload to be stored and/or executed by one or more devices (e.g., servers) in the distributed network 104. As used herein, the term "workload," and its equivalents, may refer to a program, an application, or other coordinated executable that is executed and/or stored by one or more computing devices using computing resources of the computing device(s). Computing resources, for example, may include processing resources (e.g., a central processing unit (CPU) for executing a particular task), memory resources (e.g., an amount of storage capacity allocated to storing data within memory), communication resources (e.g., an amount of time an interface and/or port is allocated to transmitting data), and so on.

An application (e.g., a distributed application) is one example of a workload that can be placed. In some examples, an application can be implemented by multiple microservices. A microservice, for instance, is a unit of code that is independently deployable on a device within a networked environment. In various implementations, the multiple microservices within an application are configured to communicate and/or coordinate via an application programming interface (API). In particular, an API may act as a gateway that connects the microservices to a client (e.g., operating on the user device 102) of the application. The API may route communications between the client and the microservices of the application. According to some cases, microservices can be deployed as part of a Kubernetes cluster. In some implementations, the application can operate with a service mesh, which may be a dedicated layer that can facilitate communication between microservices, load balancing, traffic control, and so on. Istio is an example of a service mesh that can be executed with a microservice-based application.

In some cases, the workload to be placed may be sensitive. For example, the workload may be a highly sensitive application that processes confidential data. In some cases, the workload includes multiple microservices that process confidential data in a coordinated fashion. Thus, it may be preferred that the workload is exclusively placed within a confidential computing environment. As used herein, the term "confidential computing," and its equivalents, may refer to techniques for securing code and/or data during execution. In some cloud-based computing environments, data is encrypted when it is stored and when it is transmitted across interfaces. However, the data is typically decrypted when it is executed by devices within the environments. Confidential computing refers to techniques for securing the data when it is executed by the processor(s) of physical devices within a cloud-based environment. As used herein, the terms "trusted execution environment," "TEE," and their equivalents, may refer to a portion of a processor that maintains confidentiality and integrity of data that is loaded and/or processed in the TEE. The distributed network 104 may include various devices with TEEs. However, a device with a TEE may also execute workloads outside of the TEE.

In addition, the devices and/or TEEs within the distributed network 104 may be associated with different trustworthiness characteristics. As used herein, the term "trustworthiness characteristic," and its equivalents, may refer to an object or metric that is indicative of the trustworthiness of an entity, such as a computing device, a program, a microservice, a cluster, or the like. A trustworthiness characteristic may indicate anything about an entity's apparent ability to keep data secure and to prevent exposure of the data to other entities. In some cases, a trustworthiness characteristic is represented as a Boolean (e.g., true or false, 1 or 0) value. In some examples, a trustworthiness characteristic may be defined as one of more than two levels (e.g., as an integer value between 0 and 5).

Examples of trustworthiness characteristics include executables of the entity, a configuration of the entity, a file type utilized by the entity, a hardware type of the entity, or a firmware type of the entity. As used herein, the term "executable," and its equivalents, may refer to data encoding instructions that, when executed by a processor, cause the processor to perform various actions. For example, a trustworthiness characteristic specifying an executable of an entity may be a Boolean value indicating that the entity stores a software program for executing a particular application. As used herein, the term "configuration," and its equivalents, may refer to an arrangement of functional elements (e.g., hardware, software, connected devices, etc.) within or otherwise utilized by the entity. For example, a trustworthiness characteristic specifying a configuration of an entity may be a Boolean value indicating whether data stored by the entity is automatically encrypted. As used herein, the term "file type," and its equivalents, may refer to a format in which data is stored or otherwise utilized by the entity. For example, a trustworthiness characteristic specifying a configuration of an entity may be a Boolean value indicating whether the entity stores data in a predetermined file type. As used herein, the term "hardware," and its equivalents, may refer to one or more physical components of an entity. For example, a trustworthiness characteristic specifying hardware of an entity may be a Boolean value indicating whether a processor of the entity includes a TEE. As used herein, the term "firmware," and its equivalents, may refer to a type of software that facilitates interactions between other software executed by a device and hardware components of the device. For example, a trustworthiness characteristic specifying firmware of an entity may be an integer value indicating a version of a specific type of firmware currently utilized by the entity.

Some types of workloads may be safely executed on devices with minimally stringent trustworthiness characteristics. However, in various implementations of FIG. 1, the workload may be placed in the distributed network 104 exclusively in devices that fulfill one or more trustworthiness requirements. As used herein, the term "trustworthiness requirement," and its equivalents, may refer to a minimum trustworthiness characteristic. For example, the workload to be placed in the distributed network 104 may have a trustworthiness requirement specifying that the workload can only be placed in devices including TEEs, operating a current version of a particular type of firmware, or the like.

In some implementations, the user device 102 may transmit a request to an upstream subsystem 106 within the distributed network 104. As used herein, the term "subsystem," and its equivalents, may refer to hardware (e.g., a TEE) and/or software (e.g., a microservice) that is included in and/or executed by at least one physical computing device. Examples of subsystems include TEEs, microservices, hardware enclaves, a software element configured to perform runtime application self-protection (RASP), and so on. The request may specify one or more trustworthiness requirements of the workload. Upon receiving the request, the upstream subsystem 106 may confirm that the trustworthiness characteristics of the upstream subsystem 106 satisfy the trustworthiness requirement(s) of the workload. Accordingly, the workload may be at least partly placed on the upstream subsystem 106. In various implementations, the upstream subsystem 106 is a API, such as an API gateway for multiple microservices in an application.

However, it may be beneficial to place the workload on more than one subsystem within the distributed network 104. For example, the computing resources of the upstream subsystem 106 may be insufficient to execute the entire workload. In some cases, it may be beneficial for the distributed network 104 to balance a computing load within the distributed network 104 by distributing the workload on more than one subsystem within the distributed network 104.

In some implementations, the upstream subsystem 106 may verify that a first downstream subsystem 108 within the distributed network 104 satisfies the trustworthiness requirement(s) of the workload. The upstream subsystem 106 may transmit a request for the trustworthiness characteristics of the first downstream subsystem 108 over a first interface 110. As used herein, the term "interface," and its equivalents, may refer to a discrete path over which data can be transmitted between nodes (e.g., subsystems) of a network. Interfaces can be wired (e.g., Ethernet, optical, etc.) and/or wireless (e.g., IEEE interfaces, 3GPP interfaces, etc.). The first downstream subsystem 108 may be adjacent to the upstream subsystem 106. As used herein, two subsystems are "adjacent" if they are connected to each other by a single interface, for example. The first downstream subsystem 108 may return a response indicating the trustworthiness characteristics of the first downstream subsystem 108. If the trustworthiness characteristics of the first downstream subsystem 108 satisfy the trustworthiness requirements of the workload, then the upstream subsystem 106 may distribute the workload to the first downstream subsystem 108.

However, the first downstream subsystem 108 may be connected to other subsystems within the distributed network 104 that potentially impact the trustworthiness of the first downstream subsystem 108. As illustrated in FIG. 1, the first downstream subsystem 108 may be connected to one or more second downstream subsystem(s) 112 via a second interface 114. The second downstream subsystem(s) 112 are nonadjacent to the upstream subsystem 106. If the upstream subsystem 106 distributes the workload to the first downstream subsystem 108, but the second downstream subsystem(s) 112 fail to satisfy the trustworthiness requirements of the workload, then the workload could be compromised.

In various implementations described herein, the upstream subsystem 106 may evaluate the trustworthiness characteristics of the second downstream subsystem(s) 112 as well as the first downstream subsystem 108, despite the second downstream subsystem(s) 112 being nonadjacent to the upstream subsystem 106. That is, the upstream subsystem 106 may evaluate the trustworthiness characteristics of a first chain 116 of subsystems including the first downstream subsystem 108 and the second downstream subsystem(s) 112. As used herein, the term "chain," and its equivalents, may refer to multiple subsystems that are connected to each other in series within a network.

According to various cases, the trustworthiness of downstream subsystems can be evaluated at each interface within the distributed network 104. For example, the first downstream subsystem 108 may receive, from the second downstream subsystem(s) 112 over the second interface 114, the trustworthiness characteristics of the second downstream subsystem(s) 112. The first downstream subsystem 108 may compare the trustworthiness characteristics of the second downstream subsystem(s) 112 to the trustworthiness characteristics of the first downstream subsystem 108. The first downstream subsystem 108 may determine an intersection of the trustworthiness characteristics of the first downstream subsystem 108 and the second downstream subsystem(s) 112. For example, if the second downstream subsystem(s) 112 utilize a particular file type but the first downstream subsystem 108 does not, the intersection may indicate that the first chain 116 uses the particular file type. In some instances, if the first downstream subsystem 108 utilizes version 3 of a particular type of firmware, but the downstream subsystem(s) 112 utilize version 4 of the particular type of firmware, then the intersection may indicate that the first chain 116 utilizes version 3 of the firmware. In various implementations, the first downstream subsystem 108 may indicate the intersection of trustworthiness characteristics of the entire first chain 116 to the upstream subsystem 106. Thus, the upstream subsystem 108 may determine whether the first chain 116, not merely the first downstream subsystem 108, satisfies the trustworthiness requirement(s) of the workload.

To place the workload on multiple subsystems, the upstream subsystem 106 may establish a mesh. As used herein, the term "mesh," and its equivalents, may refer to multiple subsystems over which a workload is distributed. For example, the upstream subsystem 106 may place the workload in the first downstream subsystem 108 and the second downstream subsystem 112 upon determining that the trustworthiness characteristics of the first chain 116 satisfy the trustworthiness requirement(s) of the workload.

In some implementations, the upstream subsystem 106 may evaluate the trustworthiness of multiple groups of subsystems. For example, the upstream subsystem 106 may also evaluate the trustworthiness characteristics of a second chain 118 in the distributed network 104. The second chain 118 may include a third downstream subsystem 120 that is connected to the upstream subsystem 106 via a third interface 122. The second chain 118 may further include at least one fourth downstream subsystem 124 connected to the third downstream subsystem 120 via a fourth interface 126. For example, the third downstream subsystem 120 may receive, from the fourth downstream subsystem(s) 124 over the fourth interface 126, the trustworthiness characteristics of the fourth downstream subsystem(s) 124. The third downstream subsystem 120 may compare the trustworthiness characteristics of the fourth downstream subsystem(s) 124 to the trustworthiness characteristics of the third downstream subsystem 120. The third downstream subsystem 120 may determine an intersection of the trustworthiness characteristics of the third downstream subsystem 120 and the fourth downstream subsystem(s) 124. The intersection may represent the trustworthiness characteristics of the second chain 118. The third downstream subsystem 120 may report the trustworthiness characteristics of the second chain 118 (e.g., the intersection) to the upstream subsystem 106. The upstream subsystem 106 may compare the trustworthiness characteristics of the second chain 118 to the trustworthiness requirement(s) of the workload. If the trustworthiness characteristics of the second chain 118 do not satisfy the trustworthiness requirement(s) of the workload, then the upstream subsystem 106 may refrain from placing the workload in the second chain 118.

However, in cases in which the upstream subsystem 106 determines that both the first chain 116 and the second chain 118 satisfy the trustworthiness requirement(s) of the workload, then the upstream subsystem 106 may choose between the first chain 116 and the second chain 118 for workload placement. In some cases, the upstream subsystem 106 may place the workload on the chain with superior trustworthiness characteristics. As used herein, the term "superior," and its equivalents, may refer to a characteristic or entity that is more trustworthy than another characteristic or entity. For example, a second version of firmware may be superior to a first version of the firmware. In various instances, the upstream subsystem 106 may determine that the trustworthiness characteristics of the first chain 116 are superior to the trustworthiness characteristics of the second chain 118, and may place the workload in the first chain 116 rather than the second chain 118 (even though the second chain 118 may also satisfy the trustworthiness requirement(s) of the workload). Thus, the upstream subsystem 106 may optimize placement of the workload based on the trustworthiness characteristics of the subsystems within the distributed network 104. In some implementations, the upstream subsystem 106 transmits, to the user device 102, a message (e.g., a report) indicating the trustworthiness characteristics of the first chain 116 in which the workload is placed.

According to various examples, the upstream subsystem 106 may further evaluate the trustworthiness characteristics of the downstream subsystems 108, 112, 120, and 124 after the workload is placed. In some implementations, the upstream subsystem 106 may periodically receive the trustworthiness characteristics of the first chain 116 from the first downstream subsystem 108 after the workload has been placed in the first chain 116. The trustworthiness characteristics of the first downstream subsystem 108 and/or the second downstream subsystem(s) 112 may change over time. For example, the first downstream subsystem 108 may have a software or firmware update, or may be subjected to a malicious attack that impacts its trustworthiness characteristics.

In various implementations, the upstream subsystem 106 may prune the first chain 116 from the mesh if the upstream subsystem 106 determines that the trustworthiness characteristics of the first chain 116 no longer satisfy the trustworthiness requirement(s) of the workload. As used herein, the term "prune," and its equivalents, may refer to a process of disconnecting at least subsystem from a mesh or otherwise removing at least a portion of a workload from at least one subsystem. Thus, the upstream subsystem 106 may ensure that the mesh in which the workload is placed continues to satisfy the trustworthiness requirement(s).

According to some examples, any given subsystem in the distributed network 104 may evaluate the trustworthiness characteristics of an adjacent subsystem and selectively distributed a workload on the adjacent subsystem and/or prune the adjacent subsystem based on the evaluation. For example, the upstream subsystem 106 may transmit, to the first downstream subsystem 108, an indication of the trustworthiness requirement(s) of the workload. The first downstream subsystem 108 may compare the trustworthiness characteristics of the second downstream subsystem(s) 112 to the trustworthiness requirement(s) of the workload. If the first downstream subsystem 108 determines that the trustworthiness characteristics of the second downstream subsystem(s) 112 no longer satisfy the trustworthiness requirement(s) of the workload, then the first downstream subsystem 108 may prune the second downstream subsystem(s) 112 from the mesh. Thus, the mesh can be controlled on a subsystem-by-subsystem basis within the distributed network 104.

A specific example will now be described with respect to FIG. 1. In this example, the first downstream subsystem 108, the second downstream subsystem(s) 112, the third downstream subsystem 120, and the fourth downstream subsystem(s) 124, are each microservices (e.g., Kubernetes microservices). Furthermore, the first chain 116 and the second chain 118 may represent service chains associated with a particular application. For instance, traffic between subsystems within the first chain 116 and subsystems within the second chain 118 may be each be defined using virtual services (e.g., Istio Virtual services).

In this example, the first downstream subsystem 108 may be functionally equivalent to the third downstream subsystem 120. For example, the first downstream subsystem 108 and the third downstream subsystem 120 may each implement a firewall for the application. In addition, the second downstream subsystem(s) 112 and the fourth downstream subsystem(s) 124 may each include a data processor configured to process queries from the user device 102 (that have satisfied the firewall rules of the application firewall) in accordance with the operations of the application. In this example, the subsystems within the first chain 116 and the second chain 118 are also assumed to be executed on devices within the same geographic regions with the same excess computing capacity, and communicating via networks with limited congestion. Thus, the first chain 116 and the second chain 118 may be considered largely equivalent, other than in their trustworthiness.

In response to a request from the user device 102, the upstream subsystem 106 may be configured to select between the first chain 116 and the second chain 118 for executing the operations of the application. The upstream subsystem 106 may make the selection based on the trustworthiness of the first chain 116 and the trustworthiness of the second chain 118. The upstream subsystem 106 receives, from the first downstream subsystem 108, a first message (e.g., an aggregated passport) indicating a trustworthiness characteristic of the first chain 116 and also receives, from the third downstream subsystem 120, a second message (e.g., an aggregated passport) indicating a trustworthiness characteristic of the second chain 118. For example, the first message indicates that all of the first downstream subsystem 108 and the second downstream subsystem(s) 112 are operating within TEEs manufactured by a first vendor. The second message, for instance, indicates that at least one of the third downstream subsystem 120 and the fourth downstream subsystem(s) 124 is operating within a TEE manufactured by a second vendor.

The request from the user device 102 may specify a trustworthiness requirement that that the application workload should be placed exclusively on TEEs with the first vendor. Therefore, the upstream subsystem 106 may determine to place the workload on the first chain 116, rather than the second chain 118. In practice, the upstream subsystem 106 will route queries and other application data from the user device 102 to the first chain 116 rather than the second chain 118. In addition, the upstream subsystem 106 may route messages addressed to the user device 102 from the first chain 116. Accordingly, the workload is executed on subsystems that satisfy the trustworthiness requirement of the application.

Figure 2:
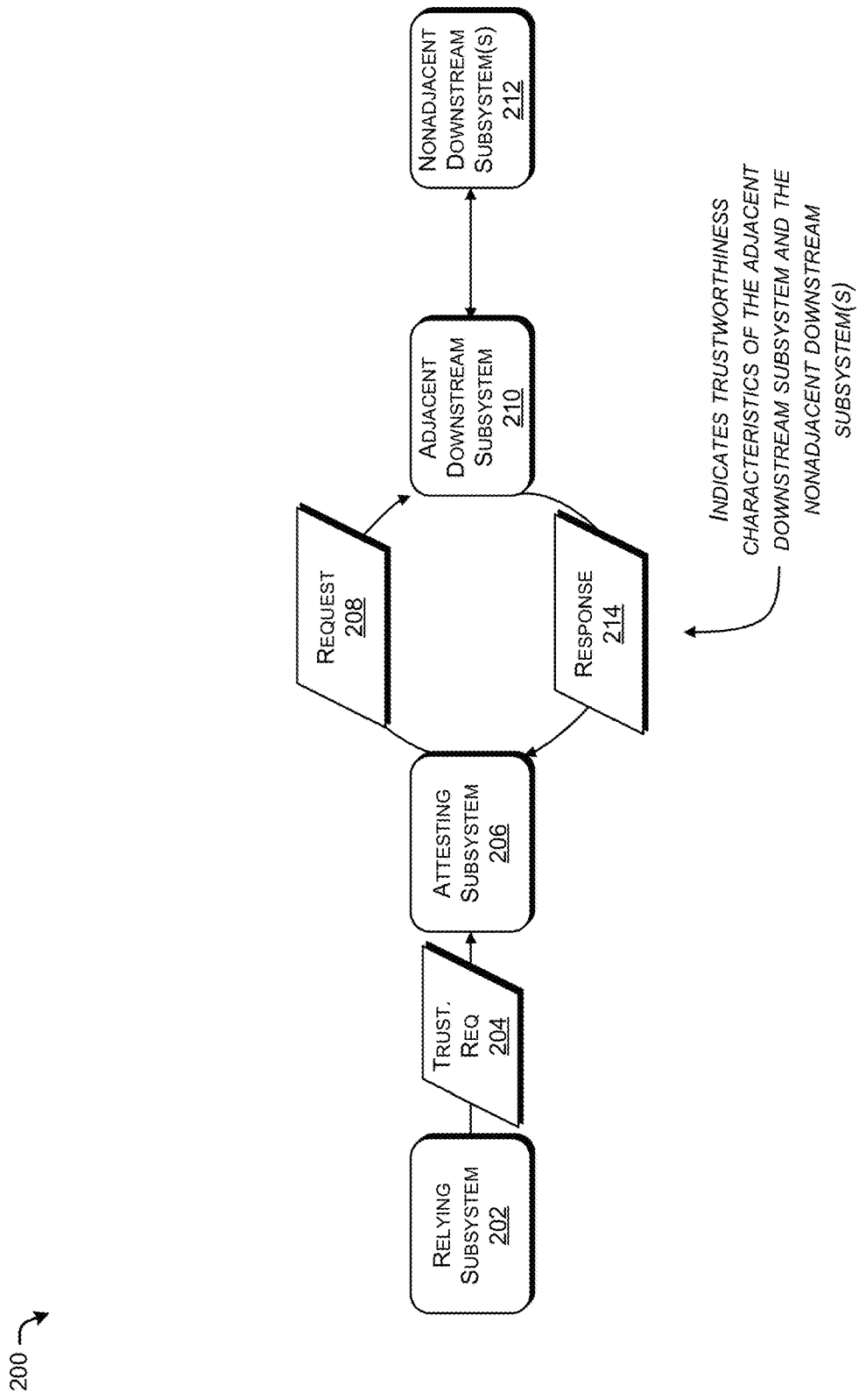
FIG. 2 illustrates an example environment for evaluating the trustworthiness of a nonadjacent subsystem.

FIG. 2 illustrates an example environment 200 for evaluating the trustworthiness of a nonadjacent subsystem. A relying subsystem 202 may transmit a trustworthiness requirement 204 to an attesting subsystem 206. In various implementations, the relying subsystem 202 may include software and/or hardware. For instance, the relying subsystem 202 may be a computing device (e.g., a server, a user device, etc.), a microservice, a VM, a runtime protection element, a hardware enclave in a computing device, or any combination thereof. The trustworthiness requirement 204 may be associated with a workload that is to be placed on other subsystems. The trustworthiness requirement 204 may specify a minimum acceptable trustworthiness characteristic for the workload. The trustworthiness requirement 204 may indicate that the workload is to be placed exclusively in one or more subsystems that satisfy the trustworthiness requirement 204.

In various implementations, the attesting subsystem 206 may include software and/or hardware. For instance, the attesting subsystem 206 may be a computing device (e.g., a server, a user device, etc.), a microservice, a VM, a runtime protection element, a hardware enclave in a computing device, or any combination thereof. In various cases, the attesting subsystem 206 includes or consists of an API operating on one or more computing devices. The attesting subsystem 206 may determine, based on the trustworthiness requirement 204, one or more subsystems wherein the workload is to be placed.

The attesting subsystem 206 may transmit a request 208 to an adjacent downstream subsystem 210. In various cases, the request 208 is for a trustworthiness characteristic of the adjacent downstream subsystem 210. In some instances, the request 208 is for a trustworthiness characteristic of a chain of subsystems including the adjacent downstream subsystem 210. For example, the chain may include at least one subsystem that is nonadjacent to the attesting subsystem 206.

In the example illustrated in FIG. 2, the adjacent downstream subsystem 210 may also be connected to at least one nonadjacent downstream subsystem 212. The nonadjacent subsystem(s) 212 may be adjacent to the adjacent downstream subsystem 210. For instance, a single interface may connect the adjacent downstream subsystem 210 to a subsystem among the nonadjacent subsystem(s) 212. Collectively, the adjacent downstream subsystem 210 and the nonadjacent downstream subsystem(s) 212 may include a chain of subsystems.

In various implementations, the adjacent downstream subsystem 210 may determine a trustworthiness characteristic that applies to the adjacent downstream subsystem 210 and the nonadjacent downstream subsystem(s) 212. For example, if a trustworthiness characteristic of the adjacent downstream subsystem 210 is different than a trustworthiness characteristic of the nonadjacent downstream subsystem(s) 212, then the adjacent downstream subsystem 210 may determine an intersection of the trustworthiness characteristic of the adjacent downstream subsystem 210 and the trustworthiness characteristic of the nonadjacent downstream subsystem(s) 212. The intersection, for instance, may be the inferior trustworthiness characteristic among the trustworthiness characteristic of the adjacent downstream subsystem 210 and the trustworthiness characteristic of the nonadjacent downstream subsystem(s) 212. According to various cases, the intersection may represent the trustworthiness characteristic of the chain that includes the adjacent downstream subsystem 210 and the nonadjacent downstream subsystem(s) 212.

The adjacent downstream subsystem 210 may transmit a response 214 to the attesting subsystem 206. The response 214 may indicate the trustworthiness characteristic of the adjacent downstream subsystem 210, the trustworthiness characteristic of the nonadjacent downstream subsystem(s) 212, the trustworthiness characteristic of the chain that includes the adjacent downstream subsystem 210 and the nonadjacent downstream subsystem(s) 212 (e.g., the intersection), or a combination thereof.

In various implementations, the attesting subsystem 206 may compare the trustworthiness requirement 204 and the trustworthiness characteristic(s) indicated in the response 214. If the attesting subsystem 206 determines that the trustworthiness characteristic(s) indicated by the response 214 fulfill the trustworthiness requirement 204 (i.e., the trustworthiness characteristic(s) are superior to or equal to the trustworthiness requirement 204), then the attesting subsystem 206 may place the workload in the chain that includes the adjacent downstream subsystem 210 and the nonadjacent downstream subsystem(s) 212. For example, the relying subsystem 202 may transmit, to the attesting subsystem 206, data and/or instructions associated with executing the workload, which the attesting subsystem 206 may forward to the adjacent downstream subsystem 210. The adjacent downstream subsystem 210 may forward at least some of the data and/or instructions to the nonadjacent downstream subsystem(s) 212, thereby enabling the chain to execute the workload. In some cases, the relying subsystem 202 and/or attesting subsystem 206 continue to transmit data to the chain (e.g., continuously and/or periodically) to enable ongoing execution of the workload over time. However, if the attesting subsystem 206 determines that the trustworthiness characteristic(s) indicated by the response 214 do not fulfill the trustworthiness requirement 204 (i.e., the trustworthiness characteristic(s) are inferior to the trustworthiness requirement 204), then the attesting subsystem 206 may refrain from placing the workload in the chain that includes the adjacent downstream subsystem 206 and the nonadjacent downstream subsystem(s) 212.

In some alternate implementations, the request 208 transmitted by the attesting subsystem 206 may indicate the trustworthiness requirement 204. In various cases, the adjacent downstream subsystem 210 may determine whether the trustworthiness characteristic of the adjacent downstream subsystem 210, the trustworthiness characteristic of the nonadjacent downstream subsystem(s) 212, or the trustworthiness characteristic of the chain, satisfies the trustworthiness requirement 204. The response 214 transmitted by the adjacent downstream subsystem 210 may indicate whether the trustworthiness characteristic of the adjacent downstream subsystem 210, the trustworthiness characteristic of the nonadjacent downstream subsystem(s) 212, or the trustworthiness characteristic of the chain, satisfies the trustworthiness requirement 204. The attesting subsystem 206 may determine whether to place the workload in the chain based on the response 214 from the adjacent downstream subsystem 210.

Similar techniques may be practiced after the workload has been placed, in order to ensure that the subsystems executing the workload continue to fulfill the trustworthiness requirement 204. For example, the attesting subsystem 206 may transmit the request 208 periodically and/or repeatedly. In some cases, after the workload has been placed in the chain, the adjacent downstream subsystem 210 may determine the trustworthiness characteristic of the chain and/or transmit the response 214 based on the updated trustworthiness characteristic of the chain periodically and/or repeatedly. If the attesting subsystem 206 and/or the adjacent downstream subsystem 210 determine that the trustworthiness characteristic of the chain no longer satisfies the trustworthiness requirement, then the attesting subsystem 206 and/or the adjacent downstream subsystem 210 may prune the chain. For instance, the attesting subsystem 206 may transmit, to the adjacent downstream subsystem 210, a message instructing the chain to discontinue executing the workload. In some cases, the attesting subsystem 206 may refrain from transmitting, to the adjacent downstream subsystem 210, ongoing data for executing the workload. Thus, if the trustworthiness of any subsystem in the chain becomes compromised, the workload can be removed from the chain.

Figure 3:
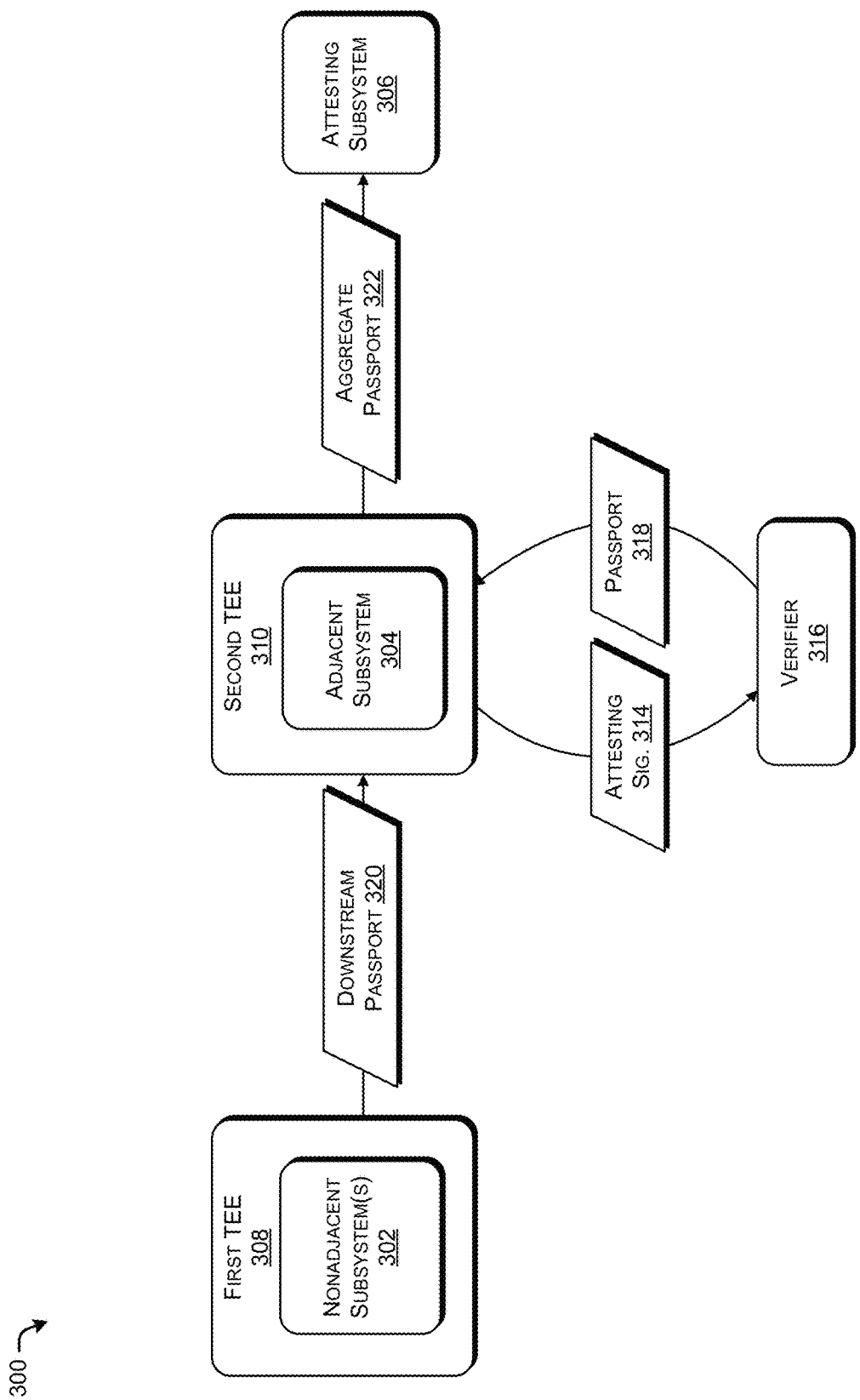
FIG. 3 illustrates example signaling for identifying the trustworthiness of subsystems in a networked environment.

FIG. 3 illustrates example signaling 300 for identifying the trustworthiness of subsystems in a networked environment. As shown, the signaling 300 involves at least one nonadjacent subsystem(s) 302, an adjacent subsystem 304, and a attesting subsystem 306. The nonadjacent subsystem(s) 302, the adjacent subsystem 304, and the attesting subsystem 306 may respectively correspond to the adjacent downstream subsystem(s) 210 and/or nonadjacent subsystem(s) 212, the attesting subsystem 206, and the relying subsystem 202 described above with reference to FIG. 2.

The nonadjacent subsystem(s) 302 and the adjacent subsystem 304 may be part of a confidential computing mesh within the networked environment. In various cases, the nonadjacent subsystem(s) 302 and the adjacent subsystem 304 are included in a confidential computing chain of subsystems within the networked environment. For instance, the nonadjacent subsystem(s) 302 may be executed within a first TEE 308 and the adjacent subsystem 304 may be executed within a second TEE 310. The first TEE 308 may be included in a processor of at least one first computing device, and the second TEE 310 may be included in a processor of at least one second computing device. The first TEE 308 may be a secure area of the processor of the first computing device(s) and may ensure that data associated with the nonadjacent subsystem(s) 302 is protected with respect to confidentiality and integrity within the first computing device(s). Similarly, the second TEE 310 may be a secure are of the processor of the second computing device(s) and may ensure that data associated with the adjacent subsystem 304 is protected with respect to confidentiality and integrity within the second computing device(s). The first computing device(s) including the first TEE 308 may store any data associated with the nonadjacent subsystem(s) 302 an encrypted format and the second computing device(s) including the second TEE 310 may store any data associated with the adjacent subsystem 304 in an encrypted format. Any data transmitted between the nonadjacent subsystem(s) 302 and the adjacent subsystem 304 may be transmitted in an encrypted format. Although not specifically illustrated in FIG. 3, the attesting subsystem 306 may also be executed within a TEE (e.g., of one or more third computing devices).

In various implementations, the attesting subsystem 306 may be configured to confirm that the adjacent subsystem 304 satisfies a trustworthiness requirement of a workload. In some cases, the attesting subsystem 306 determines at least one trustworthiness characteristic of the adjacent subsystem 304 using a passport-based attestation technique.

The adjacent subsystem 304 may transmit an attesting signature 314 to a verifier 316. The verifier 316, for example, may operate on the second computing device(s) or some other computing device within the networked environment. In various implementations, the verifier 316 may be isolated from the adjacent subsystem 304. The attesting signature 314 may indicate features about the adjacent subsystem 304, the second TEE 310, the second computing device(s), or a combination thereof. For instance, the attesting signature 314 may indicate one or more features relevant to the trustworthiness of adjacent subsystem 304, the second TEE 310, the second computing device(s), or the combination, such as executables, configuration, file types utilized, hardware, firmware, and so on. In some cases, the attesting signature 314 may specifically indicate hardware-based features about the second computing device(s), such as details about the second TEE 310 (e.g., a model of a chip including the first TEE 308).

The verifier 316 is configured to verify the entity providing the attesting signature 314 and to generate a passport 318 based on the attesting signature 314. According to various cases, the verifier 316 may determine whether the adjacent subsystem 304 is trustworthy and indicate the trustworthiness characteristic(s) of the adjacent subsystem 304 in the passport 318. In various implementations, the passport 318 has a standardized format within the networked environment, and indicates various details about the adjacent subsystem 304, the second TEE 310, the second computing device(s), or any combination thereof. In particular implementations, the passport 318 includes data indicating at least one trustworthiness characteristic of the adjacent subsystem 304. The passport 318 may include one or more trustworthiness characteristics of the adjacent subsystem 304, the second TEE 310, the second computing device(s), or a combination thereof that have been validated by the verifier 316. In some cases, the passport 318 may indicate a time at which the verifier 316 generated the passport 318, which may indicate a freshness of the passport 318. Further, the passport 318 may include a signature of the verifier 316.

In some cases, the adjacent subsystem 304 may transmit the passport 318 to the attesting subsystem 306. According to some implementations, the adjacent subsystem 304 may combine the attesting signature 314 with the passport 318 and transmit the combination to the attesting subsystem 306. The attesting subsystem 306 may determine whether the trustworthiness characteristic(s) indicated in the passport 318 satisfy the trustworthiness requirement. However, the passport 318 of the adjacent subsystem 304 may not be sufficient to show the trustworthiness characteristics of other subsystems that the adjacent subsystem 304 may expose a workload to, if it begins executing the workload. For example, the adjacent subsystem 304 may be adjacent to and connected to the nonadjacent subsystem(s) 302 operating another component of the mesh.

To ensure that the attesting subsystem 306 is aware of the posture (e.g., including trustworthiness characteristics) of adjacent subsystem 304, as well as the posture (e.g., including trustworthiness characteristics) of the nonadjacent subsystem(s) 302, the adjacent subsystem 304 may receive a downstream passport 320 from the nonadjacent subsystem(s) 302. The downstream passport 320, for example, may be at least partly provided by the verifier 316 or by some other verifier communicatively coupled to the nonadjacent subsystem(s) 302. The downstream passport 320 may indicate the trustworthiness characteristics of the nonadjacent subsystem(s) 302. For example, the downstream passport 320 may indicate a model or version of the first TEE 308 included in the first computing device(s).

In various implementations, the adjacent subsystem 304 may generate an aggregate passport 322 based on the passport 318 and the downstream passport 320. In some implementations, the aggregate passport 322 has been signed by the attesting signature 314 as well as the signature of the verifier 316. The aggregate passport 322, for instance, indicates an intersection of the trustworthiness characteristics of the nonadjacent subsystem(s) 302 and the adjacent subsystem 304. For example, if the passport 318 and the downstream passport 320 indicate that the first TEE 308 and the second TEE 310 have the same version, then the aggregate passport 322 may indicate that version. If the passport 318 and the downstream passport 320 indicate different versions, then the aggregate passport 322 may indicate the different versions or may indicate the lowest version among the different versions.

The attesting subsystem 306, in various implementations, may determine whether to place a workload and/or continue to allow a workload to be executed by the nonadjacent subsystem(s) 302 and the adjacent subsystem 304 based on the aggregate passport 322. For example, if the attesting subsystem 306 determines, based on the aggregate passport 322, that the attesting subsystem 302 and the nonadjacent subsystem(s) 302 have trustworthiness characteristics that satisfy the trustworthiness requirement of the workload, then the attesting subsystem 306 may transmit data enabling execution of the workload to the adjacent subsystem 304 (which the adjacent subsystem 304 may forward to the nonadjacent subsystem(s) 302). If, however, the attesting subsystem 306 determines that the adjacent subsystem 304 and/or the nonadjacent subsystem(s) 302 do not satisfy the trustworthiness requirement of the workload, then the attesting subsystem 306 may refrain from transmitting data associated with executing the workload to the adjacent subsystem 304 and/or may prune the nonadjacent subsystem(s) 302 and the adjacent subsystem 304 from an existing mesh executing the workload.

Figure 4:
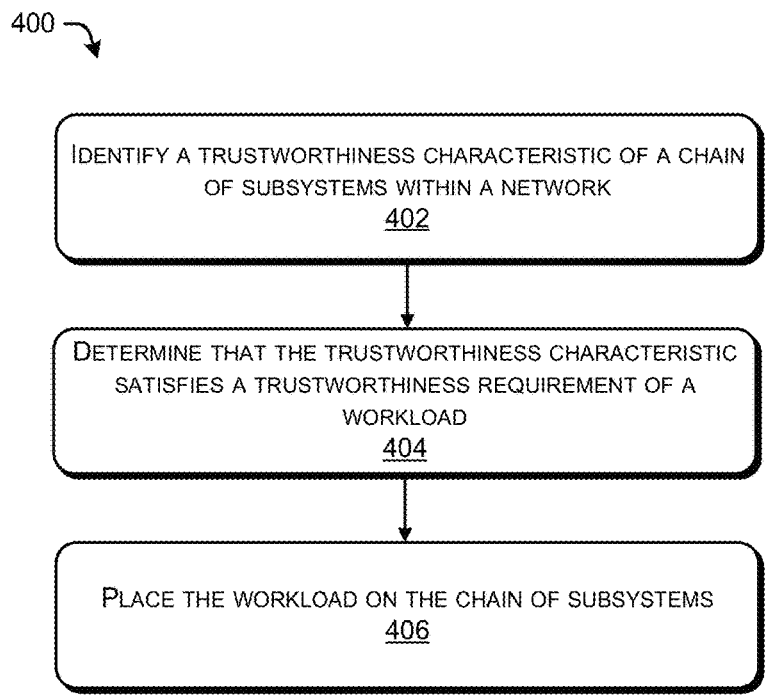
FIG. 4 illustrates an example process for placing a workload on a chain of subsystems based on the trustworthiness of the chain of subsystems.

FIG. 4 illustrates an example process 400 for placing a workload on a chain of subsystems based on the trustworthiness of the chain of subsystems. The process 400 may be performed by an entity including a computing device, a subsystem (e.g., the upstream subsystem 106 described above with reference to FIG. 1), an API, or any combination thereof.

At 402, the entity may identify a trustworthiness characteristic of a chain of subsystems within a network. The chain of subsystems may include multiple subsystems that are connected to each other, wherein the entity may be nonadjacent to at least one of the subsystems within the chain. For instance, the chain may include a first subsystem that is adjacent to the entity and a second subsystem that is adjacent to the first subsystem but is nonadjacent to the entity. In some cases, the first subsystem is executed in a TEE of a first device and the second subsystem is executed in a TEE of a second device. In various examples, the first subsystem may be or include a first microservice and the second subsystem may be or include a second microservice. Various subsystems in the chain may be connected to each other in series.

In various implementations, the entity may ascertain the trustworthiness characteristic of the chain by communicating with a subsystem that is adjacent to the entity (e.g., the first subsystem). For example, the entity may transmit a request to the adjacent subsystem requesting the trustworthiness characteristic of the chain. The adjacent subsystem may transmit a response indicating the requested trustworthiness characteristic. In some implementations, the response is or includes a passport that is indicative of a trustworthiness characteristic applicable to the chain. Examples of the trustworthiness characteristic include, for example, an executable, a configuration, a file type, a hardware type, and a firmware type of the subsystems (e.g., software included in the subsystems and/or devices executing the subsystems) in the chain. If one subsystem in the chain has an inferior trustworthiness characteristic to another subsystem in the chain, then the adjacent subsystem will indicate the inferior trustworthiness characteristic. For example, if all but one subsystem in the chain is associated with version 4 firmware, but one subsystem in the chain is associated with version 3 firmware, the response will indicate the version 3 firmware.

At 404, the entity may determine that the trustworthiness characteristic satisfies a trustworthiness requirement of a workload. In some implementations, the workload may be an application. For instance, the application may be potentially implemented by microservices among the subsystems. According to some implementations, the entity receives the trustworthiness requirement from a user device, such as a user device executing a client associated with the workload. The trustworthiness requirement may specify at least one of an executable, a configuration, a file type, a hardware type, or a firmware type. The trustworthiness requirement may be a minimum level of trustworthiness of any subsystem where the workload may be placed. For example, the trustworthiness requirement may specify an acceptable type of TEE where any portion of the workload can be placed. In the example of FIG. 4, the entity determines that the trustworthiness characteristic of the chain fulfills the trustworthiness requirement of the workload.

At 406, the entity may place the workload on the chain of subsystems. According to various implementations, the entity may transmit, to the chain of subsystems, data associated with executing the workload. For instance, the data may be received from the user device. In some implementations, the entity may receive, from the chain of subsystems, data associated with the execution of the workload, which the entity may forward to the user device. The chain of subsystems may become a part of a mesh that executes the workload.

Although not specifically illustrated in FIG. 4, the entity may perform additional operations that optimize or otherwise maintain the security of the workload. For example, the entity may periodically or repeatedly check the trustworthiness characteristic of the chain. If the trustworthiness characteristic falls below the trustworthiness requirement of the workload, then the entity may prune the chain from the mesh. In various cases, the entity may determine the trustworthiness characteristics of other subsystems within a networked environment and may compare the trustworthiness characteristics to the trustworthiness requirement. The entity may refrain from placing the workload on any subsystem that fails to satisfy the trustworthiness requirement. In some cases, the entity may selectively place the workload on a chain of subsystems with a superior trustworthiness characteristic to another, available chain of subsystems, in order to optimize the security of the workload. In various implementations, the entity may report the trustworthiness characteristic of the mesh where the workload has been placed to the user device.

Figure 5:
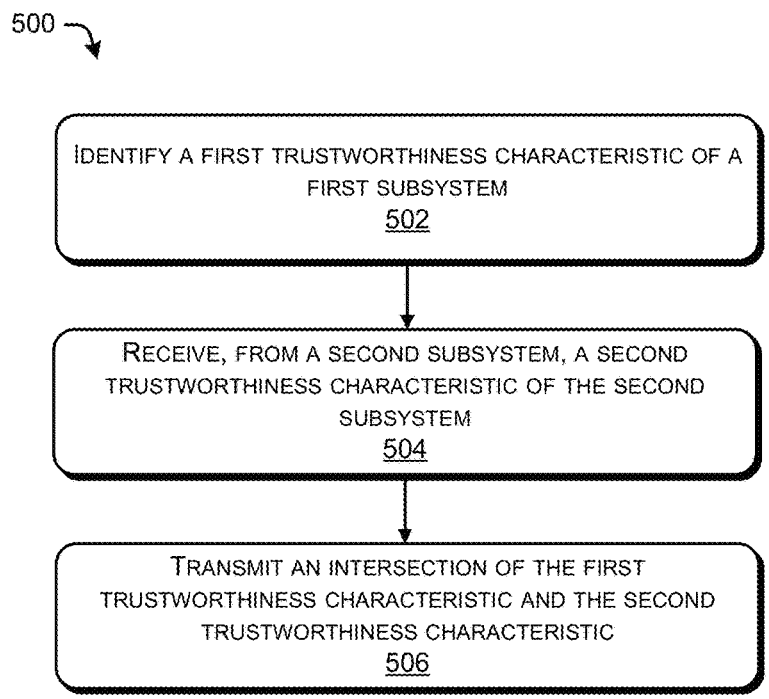
FIG. 5 illustrates an example process for providing a trustworthiness characteristic of a chain of subsystems.

FIG. 5 illustrates an example process 500 for providing a trustworthiness characteristic of a chain of subsystems. The process 500 may be performed by an entity including a computing device, a subsystem (e.g., the upstream subsystem 106, the first downstream subsystem 108, or the third downstream subsystem 120 described above with reference to FIG. 1).

In various implementations, the entity may initiate the process 500 in response to an event. For example, the entity may receive, from a relying subsystem (e.g., an API), a request for a trustworthiness characteristic of a chain of subsystems. The relying subsystem may be adjacent to the entity. In some implementations, the entity may perform the process 500 periodically. A workload associated with a trustworthiness requirement may have been previously placed on the chain of subsystems.

At 502, the entity may identify a first trustworthiness characteristic of a first subsystem. In some cases, the entity itself includes the first subsystem. The chain of subsystems may include multiple subsystems that are connected to each other, wherein the entity may be nonadjacent to at least one of the subsystems within the chain. For instance, the chain may include the first subsystem that is adjacent to a second subsystem that is adjacent to the first subsystem but is nonadjacent to the relying subsystem. In some cases, the first subsystem is executed in a TEE of a first device and the second subsystem is executed in a TEE of a second device. In various examples, the first subsystem may be or include a first microservice and the second subsystem may be or include a second microservice. Various subsystems in the chain may be connected to each other in series.

In some cases, the entity determines the first trustworthiness characteristic by interacting with a verifier. For example, the entity may transmit an attesting signature to a verifier. The verifier may be executed on the same computing device as the entity or a different computing device. The entity may receive a passport from the verifier based on the attesting signature. The passport may indicate the first trustworthiness characteristic of the first subsystem. Examples of the trustworthiness characteristic include, for example, an executable, a configuration, a file type, a hardware type, and a firmware type of the first subsystem (e.g., software included in the subsystem and/or devices executing the subsystem).

At 504, the entity may receive, from a second subsystem, a second trustworthiness characteristic of the second subsystem. In some cases, the entity receives a passport of the second subsystem that indicates the second trustworthiness characteristic. In various implementations, the second subsystem is downstream of the first subsystem within a chain of subsystems. The second trustworthiness characteristic may be applicable to the second subsystem and/or a chain of subsystems that are downstream of the first subsystem and includes the second subsystem.

At 506, the entity may transmit an intersection of the first trustworthiness characteristic and the second trustworthiness characteristic. The entity may determine the intersection by comparing the first trustworthiness characteristic and the second trustworthiness characteristic. The intersection may represent the inferior trustworthiness characteristic among the first trustworthiness characteristic and the second trustworthiness characteristic. Accordingly, the intersection may represent the minimum trustworthiness characteristic applicable to a mesh of subsystems that include the first subsystem and the second subsystem. In various implementations, the entity transmits an aggregate passport indicating the intersection. For example, the entity transmits the intersection to a relying subsystem (e.g., an API). The relying subsystem may determine to place a workload, to prune the first subsystem and second subsystem from a mesh executing the workload, or the like, based on the intersection. Although not specifically shown in FIG. 5, the process 500 may be performed periodically and/or repeatedly.

Figure 6:
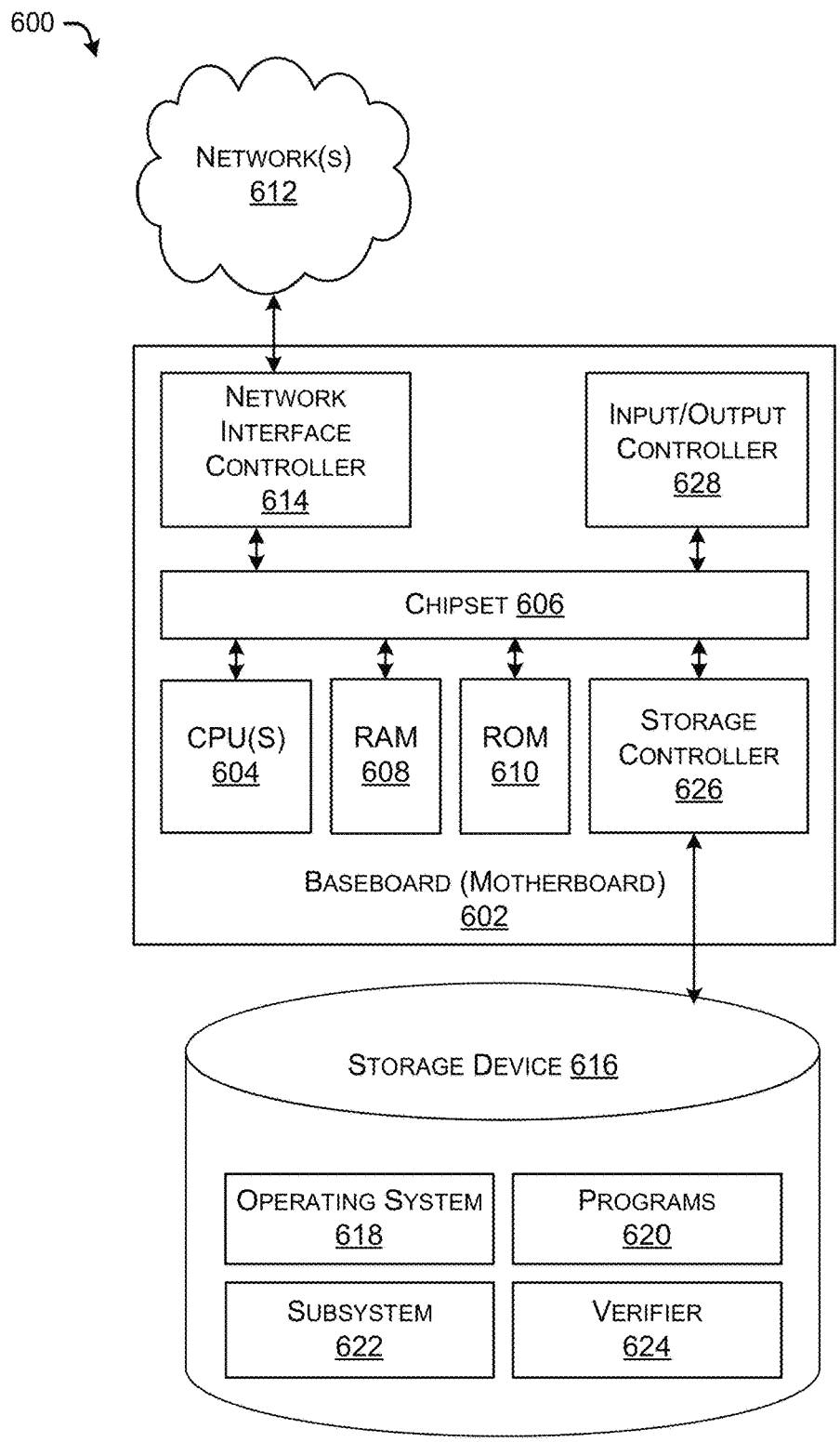
FIG. 6 shows an example computer architecture for a server computer capable of executing program components for implementing the functionality described herein.

FIG. 6 shows an example computer architecture for a server computer 600 capable of executing program components for implementing the functionality described above. The computer architecture shown in FIG. 6 illustrates a conventional server computer, workstation, desktop computer, laptop, tablet, network appliance, e-reader, smartphone, or other computing device, and can be utilized to execute any of the software components presented herein.

The computer 600 includes a baseboard 602, or "motherboard," which is a printed circuit board to which a multitude of components or devices can be connected by way of a system bus or other electrical communication paths. In one illustrative configuration, one or more central processing units (CPUs) 604 operate in conjunction with a chip set 606. The CPUs 604 can be standard programmable processors that perform arithmetic and logical operations necessary for the operation of the computer 600.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like. In various implementations, the CPUs 604 include at least one TEE.

The chipset 606 provides an interface between the CPUs 604 and the remainder of the components and devices on the baseboard 602. The chipset 606 can provide an interface to a random-access memory (RAM) 608, used as the main memory in the computer 600. The chipset 606 can further provide an interface to a computer-readable storage medium such as a read-only memory (ROM) 610 or non-volatile RAM (NVRAM) for storing basic routines that help to startup the computer 600 and to transfer information between the various components and devices. The ROM 610 or NVRAM can also store other software components necessary for the operation of the computer 600 in accordance with the configurations described herein.

The computer 600 can operate in a networked environment using logical connections to remote computing devices and computer systems through a network, such as at least one network 612. The chipset 606 can include functionality for providing network connectivity through a network interface controller (NIC) 614, such as a gigabit Ethernet adapter. The NIC 614 is capable of connecting the computer 600 to other computing devices over the network(s) 612. It should be appreciated that multiple NICs 614 can be present in the computer 600, connecting the computer 600 to other types of networks and remote computer systems. In some instances, the NICs 614 may include at least on ingress port and/or at least one egress port.

The computer 600 can be connected to a storage device 616 that provides non-volatile storage for the computer. The storage device 616 can store an operating system 618, programs 620, and data, which have been described in greater detail herein. In various implementations, the storage device 616 includes a subsystem 622 and/or a verifier 624 that, when executed by the CPU(s) 604, cause the CPU(s) 604 to perform various operations described herein. The storage device 616 can be connected to the computer 600 through a storage controller 626 connected to the chipset 606. The storage device 616 can include one or more physical storage units. The storage controller 626 can interface with the physical storage units through a serial attached small computer system interface (SCSI) (SAS) interface, a serial advanced technology attachment (SATA) interface, a fiber channel (FC) interface, or other type of interface for physically connecting and transferring data between computers and physical storage units.

The computer 600 can store data on the storage device 616 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 616 is characterized as primary or secondary storage, and the like.

For example, the computer 600 can store information to the storage device 616 by issuing instructions through the storage controller 626 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 600 can further read information from the storage device 616 by detecting the physical states or characteristics of one or more particular locations within the physical storage units.

In addition to the mass storage device 616 described above, the computer 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 600. In some examples, the operations performed by any network node described herein may be supported by one or more devices similar to computer 600. Stated otherwise, some or all of the operations performed by a network node may be performed by one or more computer devices 600 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 616 can store an operating system 618 utilized to control the operation of the computer 600. According to one embodiment, the operating system comprises the LINUX™ operating system. According to another embodiment, the operating system includes the WINDOWS' SERVER operating system from MICROSOFT Corporation of Redmond, Washington According to further embodiments, the operating system can comprise the UNIX™ operating system or one of its variants. It should be appreciated that other operating systems can also be utilized. The storage device 616 can store other system or application programs and data utilized by the computer 600.

In one embodiment, the storage device 616 or other computer-readable storage media is encoded with computer-executable instructions which, when loaded into the computer 600, transform the computer from a general-purpose computing system into a special-purpose computer capable of implementing the embodiments described herein. These computer-executable instructions transform the computer 600 by specifying how the CPUs 604 transition between states, as described above. According to various implementations, the computer 600 has access to computer-readable storage media storing computer-executable instructions which, when executed by the computer 600, perform the various processes described above with regard to FIGS. 1-5. For example, by executing the subsystem 622 and/or verifier 624, the TEE(s) within the CPU(s) 604 can perform the operations described above. The computer 600 can also include computer-readable storage media having instructions stored thereupon for performing any of the other computer-implemented operations described herein.

As illustrated in FIG. 6, the storage device 616 stores programs 620, which may include one or more processes. The process(es), subsystem 622, and verifier 624 may include instructions that, when executed by the CPU(s) 604, cause the computer 600 and/or the CPU(s) 604 to perform one or more operations.

The computer 600 can also include one or more input/output controllers 628 for receiving and processing input from a number of input devices, such as a keyboard, a mouse, a touchpad, a touch screen, an electronic stylus, or other type of input device. Similarly, an input/output controller 628 can provide output to a display, such as a computer monitor, a flat-panel display, a digital projector, a printer, or other type of output device. It will be appreciated that the computer 600 might not include all of the components shown in FIG. 6, can include other components that are not explicitly shown in FIG. 6, or might utilize an architecture completely different than that shown in FIG. 6.

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

As used herein, the term "based on" can be used synonymously with "based, at least in part, on" and "based at least partly on." As used herein, the terms "comprises/comprising/comprised" and "includes/including/included," and their equivalents, can be used interchangeably. An apparatus, system, or method that "comprises A, B, and C" includes A, B, and C, but also can include other components (e.g., D) as well. That is, the apparatus, system, or method is not limited to components A, B, and C.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

The invention claimed is:

1. A method, comprising:
    identifying at least one trustworthiness requirement for a compute infrastructure upon which an application is executed;

transmitting, to a first subsystem, a request for at least one trustworthiness characteristic of the first subsystem and at least one second subsystem connected to the first subsystem, the first subsystem comprising a first microservice operating in a trusted execution environment (TEE) of a first device, the at least one second subsystem comprising at least one second microservice operating in at least one TEE of at least one second device, the at least one trustworthiness characteristic comprising:
  at least one of an executable of the first microservice, a configuration of the first microservice, a type of hardware of the first device, or a type of firmware of the first device; and
  at least one of an executable of the at least one second microservice, a configuration of the at least one second microservice, a file type stored or executed by the at least one second device, a type of hardware of the at least one second device, or a type of firmware of the at least one second device;
receiving, from the first subsystem, a response indicating that the first subsystem and the at least one second subsystem provide the at least one trustworthiness characteristic;
determining that the at least one trustworthiness characteristic satisfies the at least one trustworthiness requirement; and
based on determining that the at least one trustworthiness characteristic satisfies the at least one trustworthiness requirement, causing the application to operate on a mesh comprising the first subsystem and the at least one second subsystem.

2. The method of claim 1, wherein identifying the at least one trustworthiness requirement associated with the application comprises receiving a message from a user device indicating that the compute infrastructure is to support the at least one trustworthiness requirement.

3. The method of claim 1, wherein the at least one trustworthiness requirement specifies at least one of a compute infrastructure trustworthiness characteristic of a set of evaluated runtime executables, a verified absence of a security misconfiguration, or a hardware type or a firmware type upon which the application is executed.

4. The method of claim 1, wherein the first subsystem and the at least one second subsystem comprise multiple subsystems connected in series within a distributed network.

5. The method of claim 1, the request being a first request transmitted at a first time, the response being a first response, the at least one trustworthiness characteristic being at least one first trustworthiness characteristic, the method further comprising:
  transmitting, to the first subsystem at a second time, a second request for at least one second trustworthiness characteristic of the first subsystem and the at least one second subsystem;
  receiving, from the first subsystem, a second response indicating the at least one second trustworthiness characteristic;
  determining that the at least one second trustworthiness characteristic fails to satisfy the at least one trustworthiness requirement; and
  based on determining that the at least one second trustworthiness characteristic fails to satisfy the at least one trustworthiness requirement, pruning the first subsystem and the at least one second subsystem from the mesh.

6. The method of claim 1, the request being a first request, the response being a first response, the at least one trustworthiness characteristic being at least one first trustworthiness characteristic, the method further comprising:
  transmitting, to a third subsystem, a second request for at least one second trustworthiness characteristic of the third subsystem and at least one fourth subsystem connected to the third subsystem;
  receiving, from the third subsystem, a second response indicating the at least one second trustworthiness characteristic;
  determining that the at least one second trustworthiness characteristic satisfies the at least one trustworthiness requirement;
  determining that the at least one first trustworthiness characteristic is superior to the at least one second trustworthiness characteristic; and
  transmitting, to a user device, a report indicating the at least one first trustworthiness characteristic,
  wherein causing the application to operate on the mesh is further based on determining that the at least one first trustworthiness characteristic is superior to the at least one second trustworthiness characteristic.

7. A system, comprising:
at least one processor; and
one or more non-transitory media storing instructions that, when executed by the system, cause the system to perform operations comprising:
  identifying at least one trustworthiness requirement for a compute infrastructure upon which an application is executed;
  transmitting, to a first subsystem, a request for at least one trustworthiness characteristic of a chain of subsystems comprising the first subsystem and at least one second subsystem, the first subsystem comprising a first microservice operating in a trusted execution environment (TEE) of a first device, the at least one second subsystem comprising at least one second microservice operating in at least one TEE of at least one second device, the at least one trustworthiness characteristic comprising:
    at least one of an executable of the first microservice, a configuration of the first microservice, a type of hardware of the first device, or a type of firmware of the first device; and
    at least one of an executable of the at least one second microservice, a configuration of the at least one second microservice, a file type stored or executed by the at least one second device, a type of hardware of the at least one second device, or a type of firmware of the at least one second device;
  receiving, from the first subsystem, a response indicating that the first subsystem and the at least one second subsystem provide the at least one trustworthiness characteristic;
  determining that the at least one trustworthiness characteristic satisfies the at least one trustworthiness requirement; and
  based on determining that the at least one trustworthiness characteristic satisfies the at least one trustworthiness requirement, causing the application to operate on a mesh comprising the chain of subsystems.

8. The system of claim 7, wherein identifying the at least one trustworthiness requirement associated with the application comprises receiving a message from a user device indicating that the compute infrastructure is to support the at least one trustworthiness requirement.

9. The system of claim 7, wherein the at least one trustworthiness requirement specifies at least one of a compute infrastructure trustworthiness characteristic of a set of evaluated runtime executables, a verified absence of a security misconfiguration, or a hardware type or a firmware type upon which the application is executed.

10. The system of claim 7, wherein the chain of subsystems comprise multiple subsystems connected in series within a distributed network, and
wherein the at least one second subsystem is nonadjacent to the system.

11. The system of claim 7, the request being a first request transmitted at a first time, the response being a first response, the at least one trustworthiness characteristic being at least one first trustworthiness characteristic, the operations further comprising:
transmitting, to the first subsystem at a second time, a second request for at least one second trustworthiness characteristic of the first subsystem and the at least one second subsystem;
receiving, from the first subsystem, a second response indicating the at least one second trustworthiness characteristic;
determining that the at least one second trustworthiness characteristic fails to satisfy the at least one trustworthiness requirement; and
based on determining that the at least one second trustworthiness characteristic fails to satisfy the at least one trustworthiness requirement, pruning, from the mesh, any connected subsystems that are reachable via an interface between the first subsystem and the at least one second subsystem.

12. The system of claim 7, the request being a first request, the response being a first response, the at least one trustworthiness characteristic being at least one first trustworthiness characteristic, the chain of subsystems being a first chain of subsystems, the operations further comprising:
transmitting, to a third subsystem, a second request for at least one second trustworthiness characteristic of a second chain of subsystems comprising the third subsystem and at least one fourth subsystem connected to the third subsystem;
receiving, from the third subsystem, a second response indicating the at least one second trustworthiness characteristic;
determining that the at least one second trustworthiness characteristic satisfies the at least one trustworthiness requirement;
determining that the at least one first trustworthiness characteristic is superior to the at least one second trustworthiness characteristic; and
transmitting, to a user device, a report indicating the at least one first trustworthiness characteristic,
wherein causing the application to operate on a mesh comprising the first chain of subsystems is further based on determining that the at least one first trustworthiness characteristic is superior to the at least one second trustworthiness characteristic.

13. A system, comprising:
at least one processor comprising a Trusted Execution Environment (TEE); and
one or more non-transitory media storing instructions that, when executed by the system, cause the TEE to execute an Application Programming Interface (API) that performs operations comprising:
receiving, from a user device, at least one trustworthiness requirement for a compute infrastructure upon which an application is executed;
transmitting, to a first subsystem, a first request for at least one first trustworthiness characteristic of a first chain of subsystems comprising the first subsystem and at least one second subsystem, the at least one second subsystem being adjacent to the first subsystem and nonadjacent to the system;
receiving, from the first subsystem, a first response indicating the at least one first trustworthiness characteristic of the first chain of subsystems;
determining that the at least one first trustworthiness characteristic fails to satisfy the at least one trustworthiness requirement;
based on determining that the at least one first trustworthiness characteristic fails to satisfy the at least one trustworthiness requirement, transmitting, to a third subsystem, a second request for at least one second trustworthiness characteristic of a second chain of subsystems comprising the third subsystem and at least one fourth subsystem, the at least one fourth subsystem being adjacent to the third subsystem and nonadjacent to the system;
receiving, from the third subsystem, a second response indicating the at least one second trustworthiness characteristic of the second chain of subsystems;
determining that the at least one second trustworthiness characteristic satisfies the at least one trustworthiness requirement; and
based on determining that the at least one second trustworthiness characteristic satisfies the at least one trustworthiness requirement, causing the application to operate on a mesh comprising the second chain of subsystems.

14. The system of claim 13, wherein the at least one trustworthiness requirement specifies at least one of a compute infrastructure trustworthiness characteristic of a set of evaluated runtime executables, a verified absence of a security misconfiguration, or a hardware type or a firmware type upon which the application is executed.

15. The system of claim 13, wherein the operations further comprise:
transmitting, to the user device, a report indicating the at least one second trustworthiness characteristic of the second chain of subsystems.

16. The system of claim 13, wherein the first subsystem comprises a first microservice operating in a trusted execution environment (TEE) of a first device, and
wherein the at least one second subsystem comprises at least one second microservice operating in at least one TEE of at least one second device.

* * * * *